L. M. LE DANTEC.
SCREW PROPELLER.
APPLICATION FILED SEPT. 21, 1911.

1,115,946.

Patented Nov. 3, 1914.
6 SHEETS—SHEET 3.

Witnesses:
U. A. Williams
F. R. Cornwall

Inventor:
Louis Marie Le Dantec
By Imrie
Attorney.

L. M. LE DANTEC.
SCREW PROPELLER.
APPLICATION FILED SEPT. 21, 1911.
1,115,946.
Patented Nov. 3, 1914.
6 SHEETS—SHEET 4.
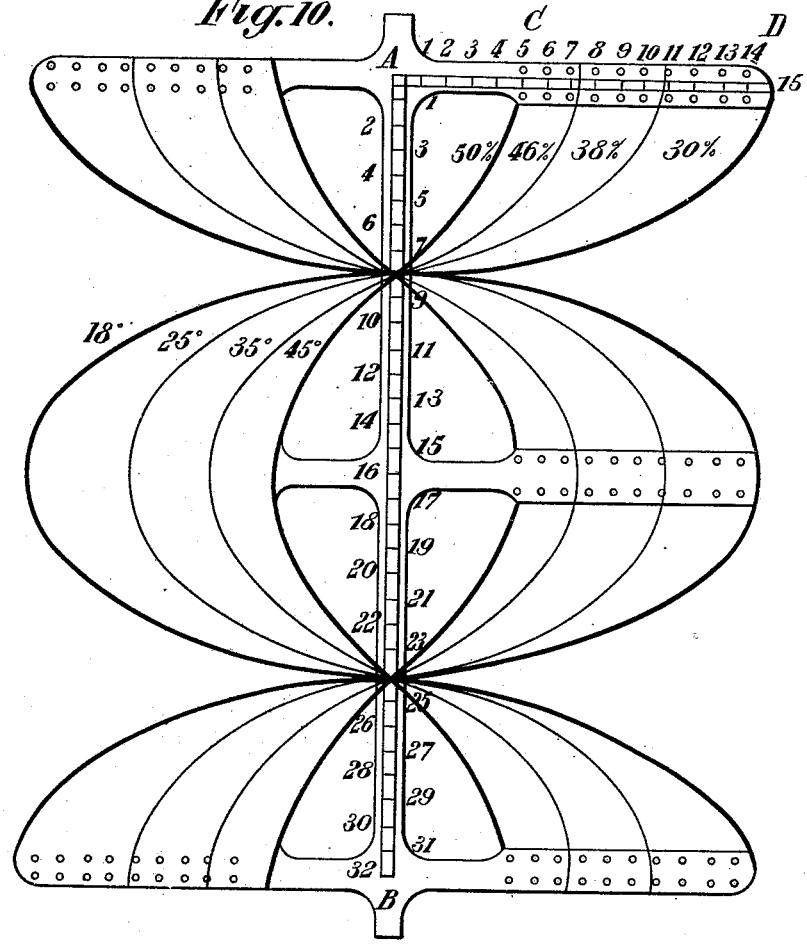
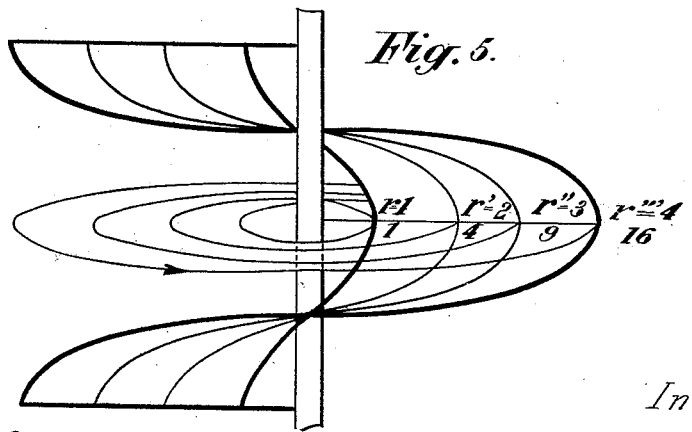
Witnesses:
Inventor.
Louis Marie Le Dantec.
By
Attorney.

L. M. LE DANTEC.
SCREW PROPELLER.
APPLICATION FILED SEPT. 21, 1911.

1,115,946.

Patented Nov. 3, 1914.
6 SHEETS—SHEET 5.

Witnesses:

Inventor
Louis Marie Le Dantec
By
Attorney.

L. M. LE DANTEC.
SCREW PROPELLER.
APPLICATION FILED SEPT. 21, 1911.

1,115,946.

Patented Nov. 3, 1914.
6 SHEETS—SHEET 6.

Witnesses:

Inventor:
Louis Marie Le Dantec
By ____ Attorney

UNITED STATES PATENT OFFICE.

LOUIS MARIE LE DANTEC, OF PARIS, FRANCE.

SCREW-PROPELLER.

1,115,946.  Specification of Letters Patent.  Patented Nov. 3, 1914.

Application filed September 21, 1911. Serial No. 650,650.

*To all whom it may concern:*

Be it known that I, LOUIS MARIE LE DANTEC, a citizen of the French Republic, and resident of Paris, France, have invented certain new and useful Improvements in Screw-Propellers, of which the following is a specification.

This invention relates to an improved screw propeller of the type usually known as "turbine screws."

The invention has for its object to increase the efficiency of turbine screws by constructing the helices or blades so that they will utilize a maximum amount of the available power in driving back the water, and to eliminate from the blades the useless portions and those portions of such low efficiency in power and speed as compared with the size and weight of the propeller as to render them of little practical use.

In describing the present invention, reference is had to a series of diagrams as shown in the accompanying drawings, said diagrams indicating with mechanical and geometrical exactness the improvements embodied in the present invention.

Figure 1:
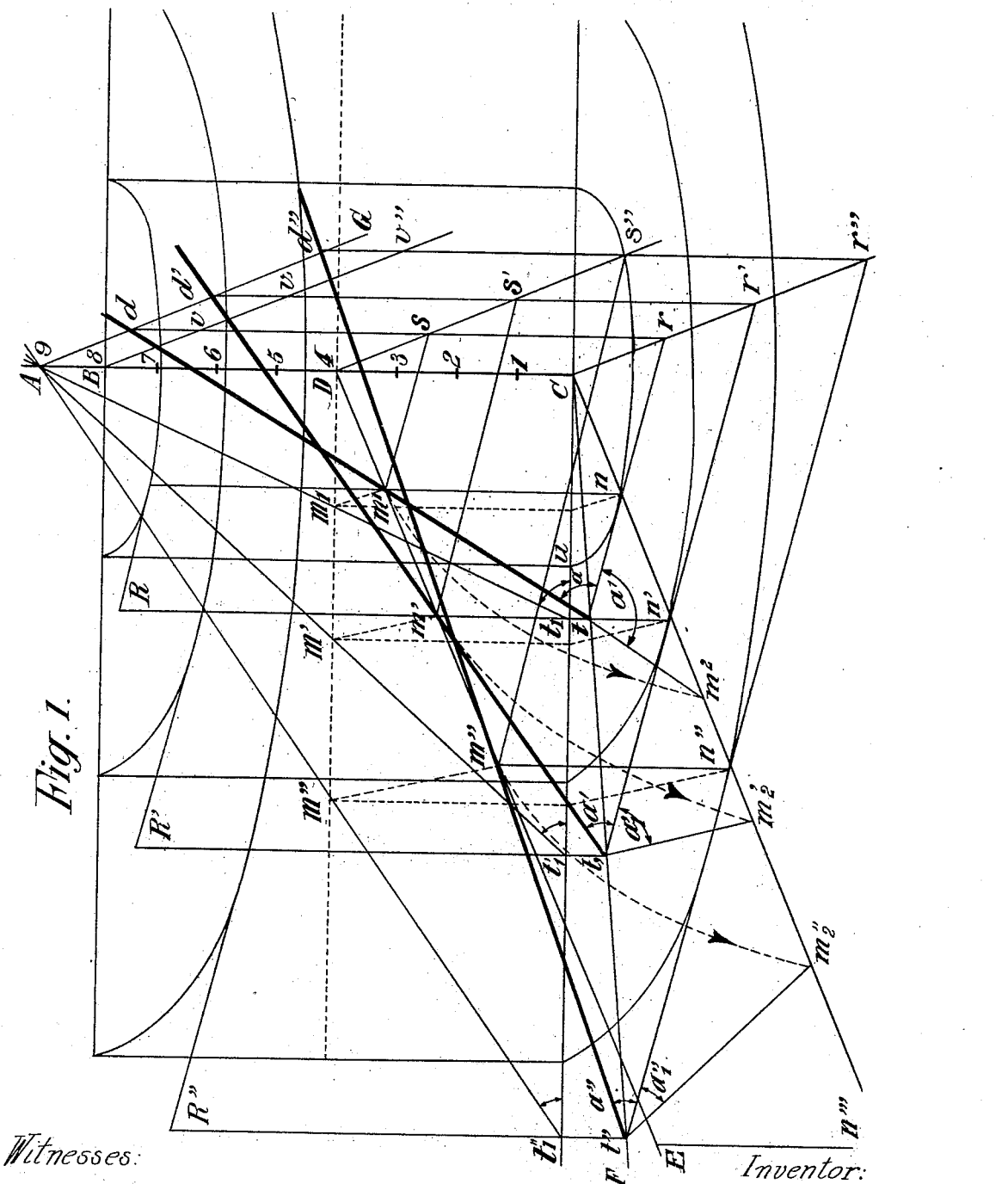
Figure 2:
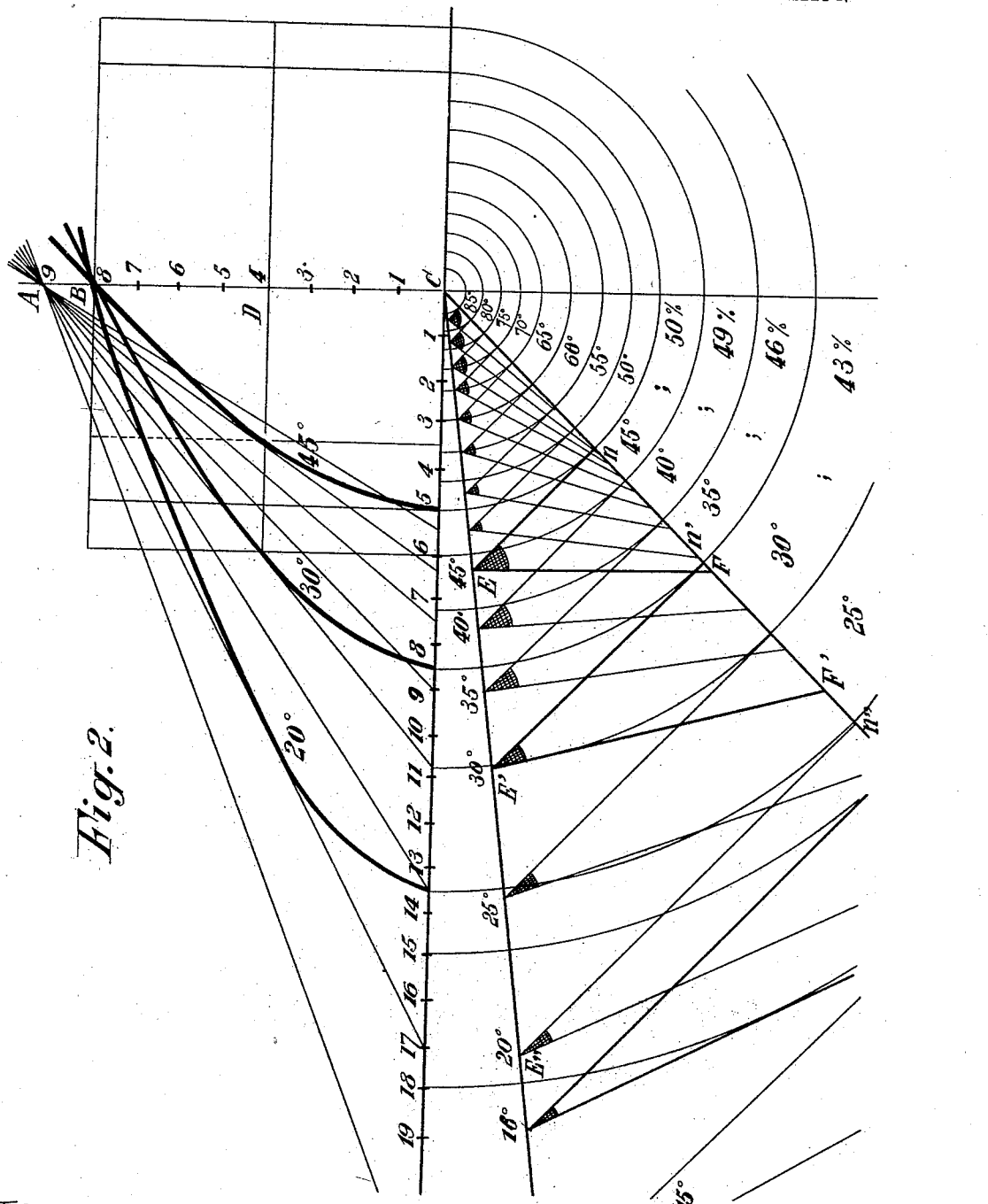
Figure 3:
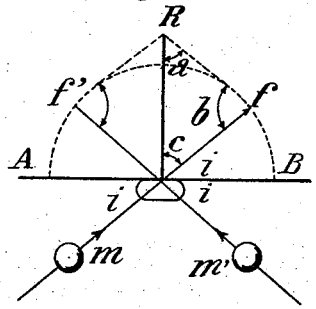
Figure 12:
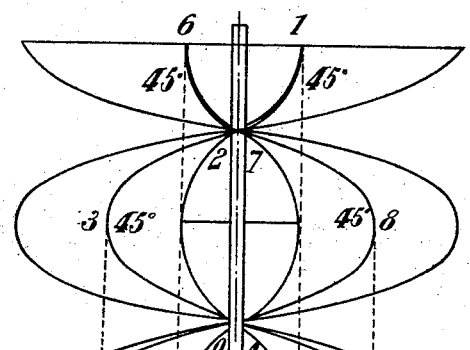
Figure 4:
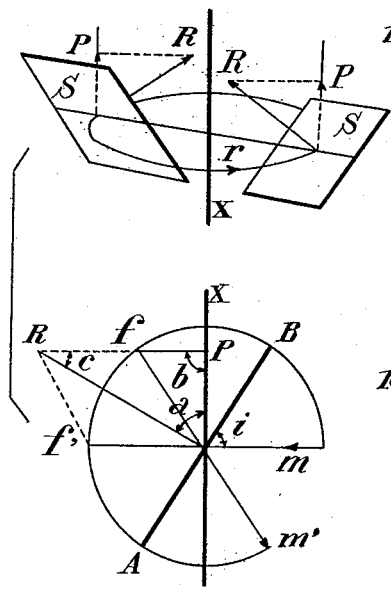
Figure 13:
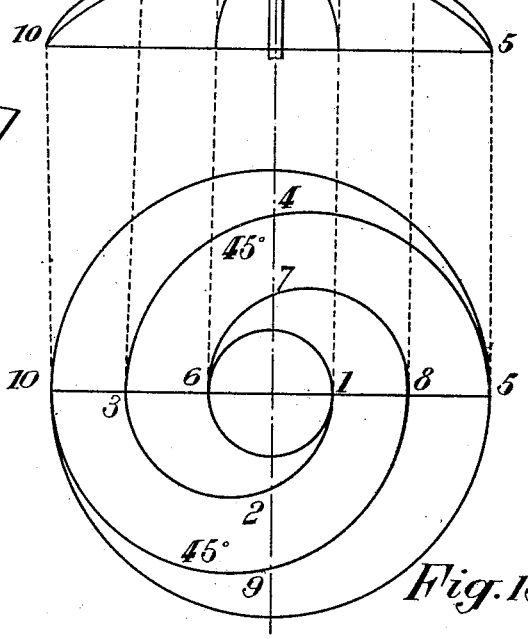
Figure 6:
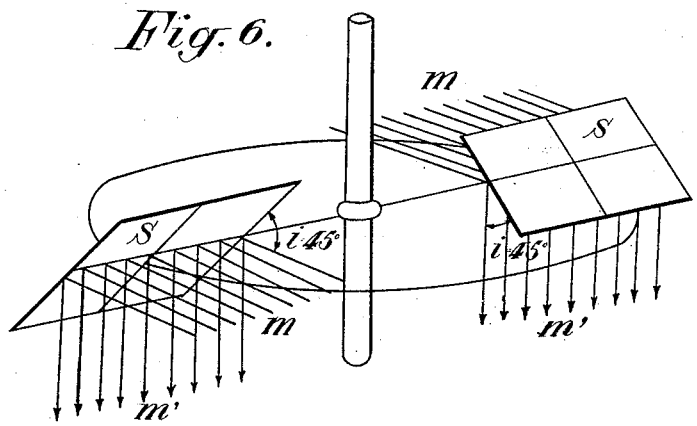
Figure 7:
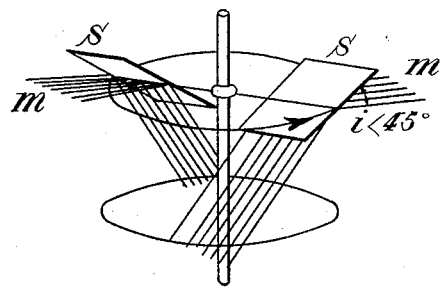
Figure 8:
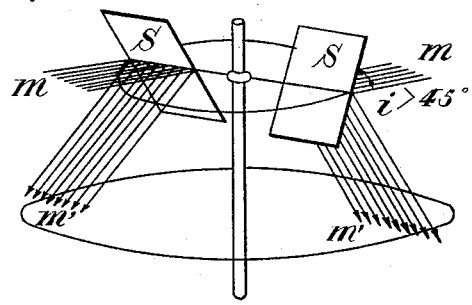
Figure 9:
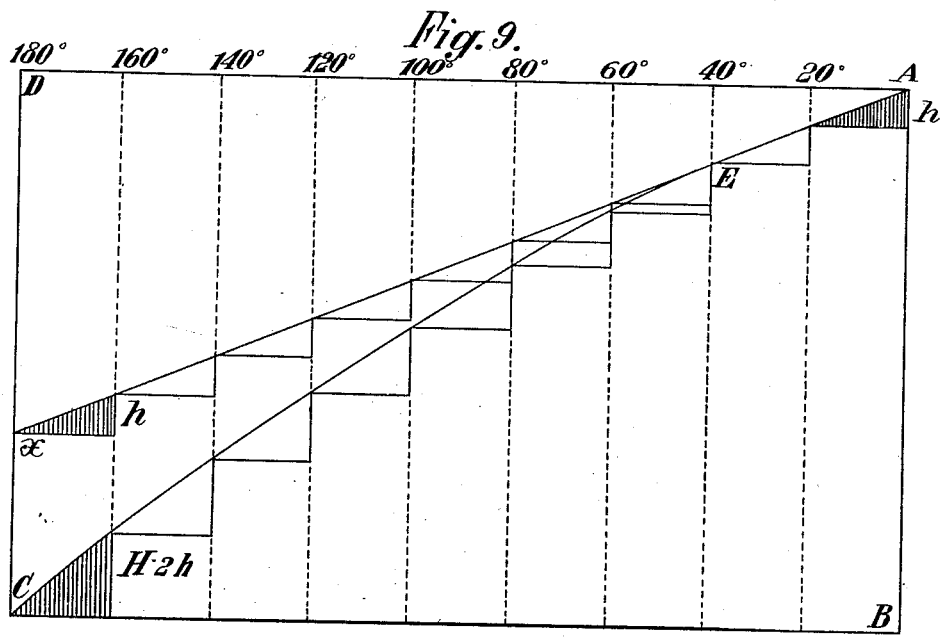
Figure 11:
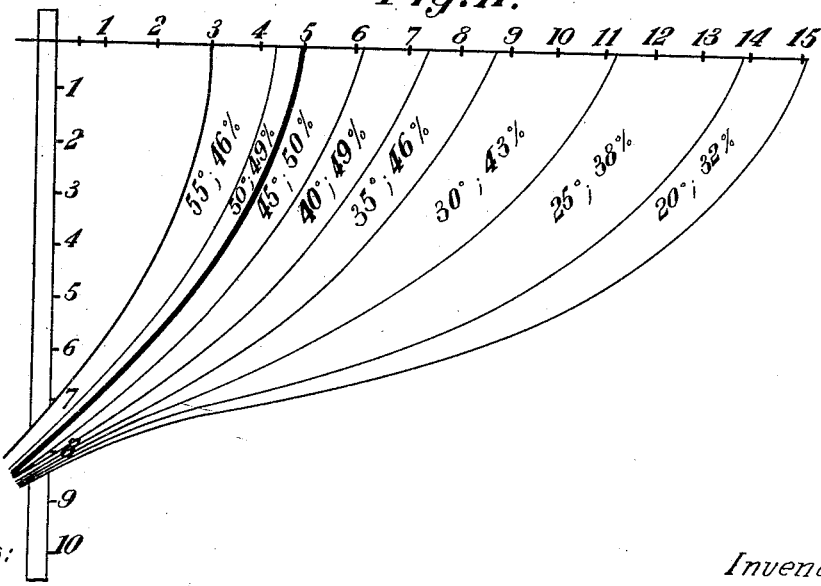

Referring more particularly to said drawings, Figure 1 shows the inclination to the axis at different radii of a helicoid of uniform pitch; Fig. 2 is a diagram showing the inclination at various radii of a helicoid of uniform pitch, the inclinations being given in degrees and the radii at which the inclinations are determined being given in a unit or modulus equal to one-thirty-second of the pitch; Fig. 3 illustrates graphically, by means of a geometric figure, the resultant force R normal to a surface due to the impact of water on the surface; and Fig. 4 illustrates a graphic method for obtaining the thrust in the direction of the axis of a rotating surface; Fig. 5 is a diagrammatic showing of the relation between the radii of the various propeller zones above-mentioned, and the relative effects of said zones; Figs. 6, 7 and 8 indicate the various directions in which the force is distributed by differently inclined surfaces to the medium acted upon; Fig. 9 is a diagrammatic view of propeller zones of uniform pitch as compared with propeller zones having a progressively increasing pitch; Fig. 10 is a diagrammatic view of a propeller the pitch of which is uniform; Fig. 11 shows the blade of a turbine screw constructed with the zones securing the most favorable results according to the invention; Figs. 12 and 13 trace the course of the 45 degree zone, showing how this zone begins at the inner edge of the blade, whereby the water enters the screw, and ends in the after part of the blade, whereby the water is ejected.

Referring to Fig. 1, $t\ d$, $t'\ d'$, $t''\ d''$, represent a series of tangents which are drawn on a series of concentric cylinders which lie within a plurality of helical curves having a common pitch and are drawn about a common axis A C. Each of the tangents $t\ d$, $t'\ d'$, $t''\ d''$, when projected vertically intersects at a single point A in the axis A C which lies above the horizontal plane passed through the curves and cylinders at the height $d\ r$, $d'\ r'$ and $d''\ r''$. The distance A B of said point A above the section B C of the axis which is the fourth part of the pitch of the curves, is almost approximately $\frac{1}{32}$ part of said pitch. This $\frac{1}{32}$ part of the pitch is hereinafter selected as the modulus of the present turbine screw propeller.

Referring to Fig. 2, in which A C is again the axis, a plurality of zones of a determined slope is indicated, each zone of a determined slope always appearing at a certain distance from the axis which distance is always capable of being specified in function of the pitch. Thus, the zone whose inclination angle is 45 degrees, is always at a distance from the axis equal to $\frac{5}{32}$ of the pitch, that is to say, five times the modulus determined by the deduction of Fig. 1. The zone whose inclination angle is 30 degrees is always at a distance from the axis equal to 10.8 times the modulus. Also, the radius of the zone whose inclination angle is 18 degrees is always equal to 15 times the modulus. Fig. 2 also shows that the zones, whose inclination angles increase from 45 to 90 degrees all lie within the central space whose radius is equal to five moduluses, whereas the zones whose inclination angles decrease from 45 to zero degrees lie outside the zones equal to $\frac{5}{32}$ of the pitch and extend into the infinite.

In Fig. 3 it is graphically shown that the resultant force R exerted by the water upon a submerged, stationary plane surface is illustrated by the formula, $$R = F \sin. i,$$

F being the total intensity of the impulse, that is, the sum of the action $f$ and the reaction $f'$. This formula may be demonstrated as follows: Assuming from what has just been stated, that $F=f+f'$, $f=f'$, and $f$ and $f'$ form equal angles with A—B, A—B being a stationary surface upon which a medium is acting in the direction of $m$, then their resultant R is always perpendicular to A—B, and $$\frac{R}{f} = \frac{\sin. b}{\sin. a};$$
$$b = 2i;$$

then $$\sin. b = \sin. 2i = 2 \sin. i \cos. i.$$
$$a = c, \text{ and } c = 90° - i;$$

then $$\sin. a = \sin. c = \cos. i.$$
$$\therefore \frac{R}{f} = \frac{2 \sin. i \cos. i}{\cos. i} = 2 \sin. i,$$

whence:

$$R = 2f \sin. i = F \sin. i.$$

Fig. 4 is intended to indicate graphically the components of the force exerted by the water in the direction of the axis of rotation X of a rotating surface S, and from this figure it will be seen that the useful work, that is to say the projection on the axis of the resultant force R, in the direction of which the propeller is acting, is given by the formula: $P = R \cos. i$, so therefore $P = F \sin. i, \cos. i$.

The efficiency of a surface striking an ambient medium when rotating around an axis is given in the following table, admitting F to be equal to 100 for all surfaces considered, i. e., admitting that they are all rotating with the same speed:

| Angles. | Sine. | Cosine. | Efficiency. |
|---|---|---|---|
| 5 degrees | 0.087 | 0.993 | 8% |
| 15 " | 0.259 | 0.967 | 25% |
| 25 " | 0.419 | 0.907 | 38% |
| 35 " | 0.569 | 0.819 | 46% |
| 45 " | 0.709 | 0.709 | 50% |
| 55 " | 0.819 | 0.569 | 46% |
| 65 " | 0.907 | 0.419 | 38% |
| 75 " | 0.967 | 0.259 | 25% |
| 85 " | 0.993 | 0.087 | 8% |

It may be seen from the above table that the greatest efficiency is secured by the surface having an inclination of 45 degrees on its rotation plane. Thus it will be observed that two perfectly plane surfaces whose inclination on their rotation plane is 45 degrees, would make the best screw propeller. The efficiency of the surfaces whose angle of inclination is different from 45 degrees decreases according to the angle varying toward 90 degrees or toward 0 degrees in such a manner that the complementary angles give the same efficiency. This being admitted, it may be seen from Fig. 2 that the efficiency soon decreases until it becomes 0 in the central part, but that said efficiency remains as high as 43 per cent. in the zone corresponding to an inclination of 60 degrees, which zone is located at a distance from the axis of $\frac{3}{32}$ of the pitch.

In the light of the above development, it appears that in the construction of turbine screws of the type herein described, it is desirable to eliminate the central part of the screw, that is that part which extends from the shaft to the zone corresponding to $\frac{3}{32}$ of the pitch.

Referring to Fig. 5 for a further development, it is deducible that the angular velocity of the screw differs for zones of different inclinations. That is, the intensity with which a surface is being applied against the water depends on the square of the velocity with which said surface strikes the water, so that for blade surfaces having radii represented by 1, 2, 3 and 4, in Fig. 5 the intensity of the reaction of the water is equal to 1, 4, 9 and 16 respectively. Applying this principle to the developments given by Fig. 2, it will readily be understood that the angular velocity rapidly approaches zero in the central part of the propeller, that is that part included within five moduluses from the axis. For this second reason, therefore, it is desirable to eliminate the central part of the turbine screw above mentioned. Furthermore, this decrease in the velocity in said central portion indicates further that if the central zone is made a part of the propeller the water contained therein would remain stagnant, and would be obliged to whirl around the axis, thus becoming a cumbersome load to be dragged by the turbine screw as is the case in the Archimedean screw. For this third reason therefore it is also desirable to eliminate the central part of the turbine screw. The acceleration of the velocity, which is proportionate to the radius, furthermore indicates as shown in Fig. 2 that, if on the one hand the decreasing velocity further decreases the efficiency of the central part inside of the 45 degrees inclination, the increase of the velocity on the other hand compensates for the decreasing of the efficiency which occurs in the propeller zones from 45 degrees up to the infinite. Thus, in the zone of 18 degrees whose radius is equal to 15 moduluses, while the radius of the 45 degree zone is only five moduluses, the intensity of the water reaction on said first zone would be nine times as large as the intensity of said water reaction on the zone of 45 degrees. Thus, said pressure being represented by 100 on the last named zone it will amount to 900 on the first one. Thirty per cent. of the 900 being equal to 270, and 50 per cent. of 100 being equal to 50, it will be evident, having in view the efficiency of the propeller, that the radius of the turbine screw should be increased. However, this increase is limited by practical conditions which prohibit the construction of a too cumbersome device.

Thus, it is evident that it is desirable not to pass outside of the zone of 18 degrees, with its efficiency rating of 30 per cent.

From Fig. 6 it appears that a surface having an inclination of 45 per cent. drives the water back parallel to the axis and causes no whirling of the water.

Fig. 7 indicates that a surface whose inclination to its rotation plane is less than 45 degrees throws the water backwardly with relation to its own motion, causing the water to whirl.

Fig. 8 shows surfaces whose inclination to their plane of rotation is greater than 45 degrees, said surfaces pulling the water in a forward direction and causing it to whirl. Consequently, if, in the incline of the turbine screw propeller, the zones whose inclination angles be not different greatly from 45 degrees, are maintained, the incline will send the water back more or less parallel to the shaft, causing little whirl, thereby producing the propeller that works in the most efficient manner. For this reason also, it seems desirable to limit the radius of the propeller to the zone of 18 degrees inclination, and, therefore, I employ a blade having an increasing pitch, becoming gradually greater, along the axis. To do so without using very difficult or impractical curves, it is desirable to increase each step of the graduations $x$, A, Fig. 9, which constitute a uniformly pitched screw of a constant quality following a simple arithmetical progression. Referring further to Fig. 9, all of the upper steps A, $x$ are equal, while the lower steps A C, from the third one E are each enlarged by $\frac{1}{3}$ of the distance $h$, so that $H=2h$, that is to say, the final pitch is twice the initial pitch $h$.

Fig. 10 represents a general diagrammatic view of the propellers built according to the present invention, the pitch not varying. The pitch A B is equal to 32 moduluses; the total radius A D is equal to 15 moduluses the width C D of the blade being equal to 10 moduluses. This propeller is provided with inclinations varying from 45 to 18 degrees whose efficiencies vary from 50 to 30 per cent. From this theoretical data, consisting of a geometrical development of the turbine "screw propeller", so called, that is, the determination of the radius or its different inclination zones, in function of its pitch and the efficiency of each of said zones, it will be evident that the new turbine screw propeller as shown in Figs. 11, 12 and 13 has the following characteristics: The interior edge of the blade of said turbine screw has a radius equal to $\frac{3}{32}$ of its pitch (Figs. 11 and 12). The radius of the exterior screw blade edge varies between $\frac{8}{32}$ and $\frac{15}{32}$ of a pitch.

Having now fully described my said invention, what I claim and desire to secure by Letters Patent is:

1. A turbine screw comprising, in combination, an axial shaft, a plurality of helicoidal blades encircling said shaft but spaced therefrom, the exterior radius of each blade varying between $\frac{8}{32}$ and $\frac{15}{32}$ of its pitch, and the interior radius between $\frac{3}{32}$ and $\frac{5}{32}$ of such pitch, and arms connecting said blades to said shaft.

2. A turbine screw comprising, in combination, an axial shaft, a plurality of helicoidal blades encircling said shaft but separated therefrom, the exterior radius of each helicoidal blade varying between $\frac{8}{32}$ and $\frac{15}{32}$ of the pitch, and the interior radius between $\frac{3}{32}$ and $\frac{5}{32}$ of the pitch, the pitch of each blade increasing in the direction of said shaft and being twice as great at the point where the screw leaves the water as at the point where it enters the water.

In testimony whereof I have hereunto set my hand in presence of two witnesses.

LOUIS MARIE LE DANTEC.

Witnesses:
 GASTON PETION,
 H. C. COXE.

---

Copies of this patent may be obtained for five cents each, by addressing the "Commissioner of Patents, Washington, D. C."